United States Patent [19]
Speit

[11] Patent Number: 5,846,280
[45] Date of Patent: Dec. 8, 1998

[54] PROCESS FOR PRODUCTION OF CHEMICALLY PRESTRESSED GLASS

[75] Inventor: Burkhard Speit, Mainz, Germany

[73] Assignee: Schott Glaswerke, Mainz, Germany

[21] Appl. No.: 842,431

[22] Filed: Apr. 24, 1997

[30] Foreign Application Priority Data

Apr. 26, 1996 [DE] Germany .................... 19 61 6679.9

[51] Int. Cl.$^6$ .................... C03C 15/00; C03B 27/00
[52] U.S. Cl. .................... 65/30.14; 65/30.13; 65/114; 501/54; 501/57
[58] Field of Search .................... 65/30.13, 30.14, 65/111, 114; 501/54, 57

[56] References Cited

U.S. PATENT DOCUMENTS

| | | | |
|---|---|---|---|
| 4,671,814 | 6/1987 | Aratani et al. | 65/30.14 |
| 5,057,134 | 10/1991 | Suzuki et al. | 65/30.13 |
| 5,279,851 | 1/1994 | Minosou et al. | 65/30.14 |
| 5,561,089 | 10/1996 | Ishizaki et al. | 501/57 |

*Primary Examiner*—Peter Chin
*Assistant Examiner*—Jacqueline A. Ruller
*Attorney, Agent, or Firm*—Michael J. Striker

[57] ABSTRACT

The process for producing a chemically prestressed glass of very high surface quality includes subjecting an $Li_2O$-free starting glass from the $SiO_2$-$Al_2O_3$-$M_2O$-MO system which also contains $TiO_2$, $CeO_2$ and $F_2$ to chemical ion exchange by immersing it in a potassium salt bath at a temperature between 350° C. and 550° C. and at a residence time of between 0.5 and 20 hours to form the chemically prestressed glass. In a preferred embodiment of the process, the potassium salt bath contains a potassium nitrate melt and the glass is polished after prestressing. The chemically prestressed glass is particularly useful for making hard disks.

8 Claims, No Drawings

PROCESS FOR PRODUCTION OF CHEMICALLY PRESTRESSED GLASS

BACKGROUND OF THE INVENTION

The present invention relates to a process for the production of a chemically prestressed glass of high breaking strength and high chemical resistance, and to a method of using this glass.

Glass is advantageous for use as a substrate for data carriers (hard disks) compared with metals, such as aluminum, or metal alloys, because of its low surface roughness and flatness, among other things. Such substrate glasses must withstand increased chemical, thermal and mechanical loads during manufacture of hard disks and during use. Thus, they are subjected to high temperatures and short cooling times during coating (for example, by cathode sputtering). When used as hard disks, high mechanical loads occur, for example, at rotational speeds from 3500 to 10,000 rpm and clamping stresses on the axis of rotation of up to 300 N/mm.

Glasses which have not been prestressed are very susceptible to breakage because of tensile stresses. In particular, thin glasses having a thickness of from 0.25 to 3.00 mm can only withstand the loads. mentioned if they have been prestressed.

Compared with unprestressed glasses, prestressed glasses have a lower probability of breakage for a given load or the probability of breakage only becomes of equal magnitude at a higher load.

Since increasing the mechanical strength by thermal prestressing is only possible from a minimum thickness of 3 mm, chemical prestressing by ion exchange in a salt bath is the method of choice here.

In chemical prestressing at below the glass transition temperature Tg, alkali metal ions having a small ionic diameter from the glass are replaced by alkali metal ions of large diameter from the salt bath, for example Li+by Na+, Na+by K+. Thus, with compressive stress zones having a thickness from about 14 to 230 pm, which corresponds to about ⅔ of the ion exchange depth, flexural strengths of from 350 to 900 N/mm² can be built up.

Another important factor for successful production of compressive stress layers is the composition of the glass. The presence of Li ions in the glass makes it more difficult to carry out ion exchange processes, since two types of ion are exchanged, namely Li+by Na+and Na+by K+, and since a specific mixing ratio between Na and K salts and narrow temperature limits must generally be observed during the exchange process.

Together with oxygen ions, the fluoride component in the glass forms the anion network of the glass, in which large ions can easily diffuse. This favors stress reduction.

If the substrate glass contains relatively large amounts of fluoride, chemical prestressing can usually only be achieved for a short time or is predominantly lost through the coating, for example during heating.

For this use, the quality of the glass with respect to the number and size of flaws, such as solid inclusions and bubbles, is also of importance, since bubbles at the surface of the substrate cause, when polished, holes, which result in impermissible unevenness of the surface.

German Published Patent Application DE 42 06 268 Al describes a lithium-containing aluminosilicate glass for use as a hard disk substrate glass. Although the presence of $Li_2O$ improves the ability to refine, it also makes chemical prestressing more difficult.

Besides the surface flatness, the chemical resistance of the substrate glass is of very great importance for the functionality of a fixed disk: The read/write head of a computer is at a small distance of about 50 nm from the fast-rotating hard disk. This distance must be maintained precisely for fault-free functioning. However, it is reduced if the surface of the hard disk substrate is not resistant to the effects of the atmosphere and chemical attack even before the coating operation roughens the surface (for example through efflorescence) or if the surface loses its adhesion to the layer sequence applied owing to the effects of the atmosphere and detaches therefrom.

It is a problem that the resistance of a glass surface to attack by water, caustic lye or acid is usually reduced by chemical prestressing, i.e. the increase in the concentration of relatively large alkali metal ions. This is because the chemical resistance not only drops with increasing alkali metal concentration, but these attacks also become more effective the larger the alkali metal ions.

SUMMARY OF THE INVENTION

It is an object of the present invention to provide a process for production of a chemically prestressed glass which not only has high flexural strength, but also high chemical resistance.

It is another object of the present invention to provide a method of using the chemically prestressed glass and a product of that method.

According to the invention, the process for producing a chemically prestressed glass of high breaking strength and high chemical resistance comprises subjecting a starting glass having the composition (in mol %, based on oxides):
$SiO_2$ from 63.0 to 67.5 mol %,
$Al_2O_3$ from 9.5 to 12.0 mol %,
$Na_2O$ from 8.5 to 15.5 mol %,
$K_2O$ from 2.5 to 4.0 mol %,
$MgO$ from 3.0 to 9.0 mol %,
$\Sigma$ $CaO+SrO+BaO+ZnO$ from 0 to 2.5 mol %,
$TiO_2$ from 0.5 to 1.5 mol %,
$CeO_2$ from 0.02 to 0.5 mol %,
$As_2O_3$ from 0 to 0.35 mol %,
$SnO_2$ from 0 to 1.0 mol %, and
$F_2$ from 0.05 to 2.6 mol %,
wherein the molar ratio of the $SiO_2$ to the $Al_2O_3$ in the starting glass is between 5.3 and 6.85, the molar ratio of the $Na_2O$ to the $K_2O$ is between 3.0 and 5.6, the molar ratio of the $Al_2O_3$ to $K_2O$ is between 2.8 and 3.6 and the molar ratio of the $Al_2O_3$ to a total amount of the $TiO_2$ and the $CeO_2$ is between 7.6 and 18.5; to chemical ion exchange in an ion exchange bath containing more than 90% by weight of at least one potassium salt at a temperature between 350° C. and 550° C. and with a residence time of between 0.5 and 20 hours to form the chemically prestressed glass.

A prerequisite for providing the compressive stress zone to be generated in the prestressing process with the desired properties is the composition of the glass.

In the aluminosilicate glasses used in accordance with the invention, the $SiO_2$ content must not exceed 67.5 mol %, since otherwise the melting points increase excessively. On the other hand, the $SiO_2$ content must not drop below 63.0 mol %, since otherwise the chemical resistance is impaired excessively. For the same reasons, the $Al_2O_3$ content must not exceed 12.0 mol % or drop below 9.5 mol %. In order to ensure both good acid resistance and good ion exchangeability, $SiO_2$ and $Al_2O_3$ must be present in a balanced ratio to one another. Thus, the $SiO_2/Al_2O_3$ molar ratio should be between 5.3 and 6.85.

An essential constituent of the glasses are the alkali metal oxides. Because of the effective combination of refining agents described below, $Li_2O$ can be omitted completely, which makes it possible to achieve the desired properties with respect to surface quality and chemical prestressing simultaneously in a single glass.

The $Na_2O$ content should be between 8.5 and 15.5 mol %. If it is higher than 15.5 mol %, the chemical resistance is impaired, and if it is lower than 8.5 mol %, firstly the glass becomes more difficult to melt and secondly the increase in strength by Na+/K+ion exchange only becomes possible to a restricted extent.

A constituent having a particular and surprising action is $K_2O$, which should be present in an amount of from 2.5 to 4.0 mol %. It further increases the meltability of the glass and accelerates an ion exchange process of the Na ion in the glass by the K ion in the salt bath. In addition, homogenization is simplified, which means an improvement with respect to the desired freedom from bubbles. This is because $K_2O$ increases the basicity of the glass more than the same number of moles of $Na_2O$, thus simplifying refining without impairing the high chemical resistance or chemical prestressability. The simplified production of glass of high bubble quality with the same chemical and mechanical properties is only ensured in the stated range. If the $K_2O$ content is lower than 2.5 mol % and if the $Al_2O_3/K_2O$ ratio is less than 2.8, the bubble density and bubble size increase; if the $K_2O$ content is greater than 4.0 mol % and the $Al_2O_3/K_2O$ ratio is greater than 3.6, the strength of the glasses cannot be increased sufficiently during prestressing.

The two alkali metal oxides must also be present in a balanced ratio to one another. Thus, the $Na_2O/K_2O$ molar ratio should be between 3.0 and 5.6.

A further necessary constituent is MgO, which should be present in a minimum amount of 3.0 mol %. This increases the basicity of the glasses and thus promotes homogenization. However, it also inhibits the ion exchange process, since the Na ions are bound more strongly in aluminosilicate glass structures in the presence of divalent ions. For this reason, a maximum content of 9.0 mol % of MgO should not be exceeded. The other alkaline earth metal oxides and ZnO also have the same effects. The glass can therefore also contain CaO, SrO, BaO and ZnO in a total amount of 0–2.5 mol % Σ CaO+SrO+BaO+ZnO, preferably from 0.1 to 2.5 mol % Σ CaO+SrO+BaO+ZnO. The preference for MgO over the other alkaline earth metal oxides and ZnO is due to the fact that MgO improves the meltability in a similar way as BaO and CaO, but reduces the chemical resistance much less than these oxides.

$TiO_2$ is a further necessary component of the glass. It should be present in an amount of at least 0.5 mol %, but a content of 1.5 mol % should not be exceeded, since otherwise difficulties occur during melting of the batch.

The other components, refining agents and refining aids must also be present in a balanced combination in order to achieve the best results regarding bubble quality. $CeO_2$ should be present in the glass in an amount of between 0.02 and 0.5 mol %. It not only has a refining function, but also additionally provides the glass with sufficiently high absorption of UV radiation, which is medically questionable, thus also enabling use of the glass in the lighting industry. It has been found that the requisite amount of refining agents depends on the amount of $Al_2O_3$ present. The more $Al_2O_3$ that is present in the glass, the more refining agents are necessary. In particular, an $Al_2O_3/(CeO_2+TiO_2)$ molar ratio of between 7.6 and 18.5 should be observed.

As further refining agents, $As_2O_3$ in amounts of up to 0.35 mol % and $SnO_2$ in amounts of up to 1.0 mol % may be appropriate. Of these two components, at least one is preferably present in an amount of at least 0.02 mol %. In order to achieve particularly high quality with respect to a low number and size of bubbles, the glass used should contain $As_2O_3$ in an amount between 0.02 and 0.35 mol %.

The glass must furthermore contain $F_2$ in an amount between 0.05 and 2.6 mol %. The lower limit is set by the requirements for bubble quality, and the upper limit results from the effect of the fluoride in the glass network that has already been described above. In the case of arsenic-containing glasses, the range from 0.05 to 0.7 mol % of $F_2$ is preferred, and in the case of arsenic-free glasses, the range from >0.5 to 2.6 mol % of $F_2$ is preferred.

Surprisingly, a deep compressive stress zone with long-lasting compressive stress can be built up in these glasses in a simple manner by chemical prestressing without impairing the good chemical resistance. The glass articles are left for from 0.5 to 20 hours in salt baths comprising from 100 to more than 90% by weight of at least one potassium salt at bath temperatures between 350° C. and 550° C. This type of treatment produces compressive stress zones with a thickness from about 14 μm to greater than 230 μm, lower temperatures making longer residence times necessary. All customary potassium salts whose anions are stable in the stated temperature range can be used for the salt bath. The salt bath (in general commencing with 100% of potassium salt) is replaced when the potassium content has dropped, because of the exchange, to the extent that the desired exchange depth is no longer achieved. This is in general the case at 90% by weight of potassium salts. It is also possible to use from the very beginning up to 10% by weight of other salts to lower the melting point of the bath. This naturally means that the exchange capacity of the bath is then exhausted correspondingly earlier.

The chemical prestressing of the glasses by ion exchange can in some cases result in undesired roughness on the surface.

In an advantageous embodiment of the novel process, the glasses are polished after the prestressing. This sequence of the process steps, which differs from the prior art, is enabled here, without loss of the high breaking strength, by the thickness of the resultant compressive stress layer. The layer should advantageously have a thickness of ≧25 μm; this is achieved, for example, by ion exchange lasting about 1 hour at a temperature of 450° C., but can also—be achieved by other times and temperatures as shown in Table 2. Polishing after the prestressing allows the mechanical changes in the surface which have occurred during chemical prestressing to be removed again, giving glasses having excellent surface quality. The good chemical resistance is also retained. In addition to the improvement in the surface quality, the procedure described here also means a simplification in the production process, since fewer purification steps are required. The glasses are polished with cerium oxide to a residual roughness corresponding to an RMS (root mean square) value of <1 nm.

The prestressed glasses produced by this process simultaneously have the following advantages, which are unique in this combination:

high flexural strength,
a deep compressive stress zone,
virtually no relaxation of the compressive stress produced,
good surface quality,
high chemical resistance.

Because of their particular properties, the prestressed glasses produced by the novel process are highly suitable for use as substrate glasses for hard disks.

WORKING EXAMPLES

Table 1 shows examples of prestressed glasses produced by the novel process. The table contains their composition, data on the ion exchange conditions in a $KNO_3$ bath, and relevant properties regarding chemical resistance and strength.

The glasses were produced from conventional raw materials in 4 1 platinum crucibles. The raw materials were introduced over a period of 8 hours at melt temperatures of 1580° C. The glass was subsequently kept at this temperature for 14 hours, then cooled to 1400° C. over the course of 8 hours with stirring and poured into a graphite mold preheated to 500° C. For visual preliminary inspection, the resultant cast block was converted into a tube with polished surfaces.

Circular glass disks with the shape and dimensions of hard disk substrates, i.e. an external diameter of 65.0 mm and a thickness of 0.635 mm, with a central hole having a diameter of 20.0 mm were produced from this cast block in a conventional manner. The finely ground and polished glass disks were then chemically prestressed in a $KNO_3$ bath under the respective conditions shown in the table.

The properties and parameters shown in the table were determined using the following physical analysis methods.

The flexural strength is determined by the following method, which is conventional in the glass industry and is aimed at the loads occurring in practice.

In the so-called double-ring test, the chemically prestressed glass disk having the shape and dimensions of a hard disk substrate is laid, centered, on a metal supporting ring having an annular cutter of hardened steel with a diameter of 60 mm, i.e. somewhat smaller than the disk to be tested ($\phi$=65 mm). A further metal supporting ring having a steel cutter is likewise laid, centered, on top of the glass disk. This cutter, with a diameter of 25 mm, is somewhat larger than the central hole ($\phi$=20 mm) of the hard disk substrate. This upper ring presses with its cutter at a rate of 2 mm/min on the glass disk lying on the cutter of the lower ring and thus exerts a constantly increasing force on the hard disk substrate. The load at which the substrate breaks is given as the flexural strength [$N/mm^2$]. The test is regarded as passed if the breakage only occurs at a load of >100 N.

The compressive stress is measured by a stress-optical method. If the glass plate is subjected to compressive stress, the refractive indices parallel and perpendicular to the direction of the stress change, and the glass plate becomes birefringent. The birefringence, the difference between these refractive indices, is proportional to the applied stress via the stress-optical constant of the glass in question and is determined from the path difference between perpendicular and parallel polarized light after reflection at the glass surface.

The thickness of the compressive stress zone is measured by the following method.

A glass sample is observed under a polarizing microscope at a wavelength of 546 nm. The sample coated by ion exchange is under compressive stress over the entire surface and under tensile stress in its interior for equilibrium reasons. In order to measure the stress, the sample is introduced between 2 crossed polarizers. The stress exerted on the sample causes a brightening in the ray path of the microscope owing to stress birefringence. The transition from tensile stress to compressive stress (O-order neutral zone) is evident as a broad dark strip under the microscope. The distance of the O order from the edge of the sample is a measure of the thickness of the compressive stress zone.

The glass disks described above are too thin for this measurement, so glass slips measuring 6 mm×50 mm with a thickness of 2 mm produced and hardened under the same conditions as the glass disks are used.

The Knoop hardness is determined in accordance with DIN 52333.

In order to test the chemical resistance, a fast and simple test method which can be carried out using uncomplicated equipment is expedient. There is to date no standardized test method specifically for glass data carriers. In the glass industry, various methods for testing the chemical resistance of glass products are known, but these are, for various reasons, unsuitable for determining the chemical resistance of hard disk substrates.

So-called alkali leaching of the disk produced by the novel process is determined by a new method which is simple to carry out and gives very meaningful results. The term alkali leaching here is taken to mean the total amount of alkali metal ions which are dissolved out of the sample in the following test under the following conditions. The sample is a prestressed, circular glass disk having the shape and dimensions as described above an external diameter of 65.0 mm with a central hole having a diameter of 20.00 mm and a thickness of 0.635 mm, with finely ground and beveled edges and surfaces polished to an RMS roughness of <1 nm using the cerium oxide. The sample after prestressing or, in the preferred embodiment, after prestressing and polishing, is washed in a final cleaning step for ¼ hour in an ultrasound bath at room temperature in deionized water, placed, still damp, in 25 ml of deionized water at 80° C. and left there for 24 hours. The amount of alkali metal ions leached out is measured by means of atom absorption spectrometry.

The amount of alkali metal leached out in $\mu$g in each case relates to one sample.

TABLE I

Composition (in mol %, based on oxides) of Prestressed Glasses Produced according to the invention, and their essential properties.

|  | 1 | 2 | 3 | 4 | 5 | 6 | 7 |
|---|---|---|---|---|---|---|---|
| $SiO_2$ | 65.54 | 67.32 | 63.60 | 63.67 | 66.26 | 66.83 | 67.36 |
| $Al_2O_3$ | 9.60 | 11.18 | 11.91 | 9.74 | 10.91 | 10.91 | 11.28 |
| $Na_2O$ | 8.66 | 13.58 | 12.49 | 16.02 | 11.30 | 11.30 | 12.82 |
| $K_2O$ | 2.68 | 3.17 | 3.48 | 2.89 | 3.82 | 3.82 | 3.82 |
| MgO | 8.62 | 3.29 | 6.51 | 3.97 | 3.25 | 3.25 | 3.25 |
| CaO + SrO + BaO + ZnO | 1.25 | 0.24 | 0.47 | 0.14 | 0.12 | 0.12 | 0.24 |
| $SnO_2$ | 1.0 | — | — | 0.15 | — | — | 0.15 |
| $TiO_2$ | 1.19 | 0.54 | 0.66 | 0.64 | 1.23 | 0.66 | 0.54 |

TABLE I-continued

Composition (in mol %, based on oxides) of Prestressed Glasses Produced according to the invention, and their essential properties.

| | 1 | 2 | 3 | 4 | 5 | 6 | 7 |
|---|---|---|---|---|---|---|---|
| $CeO_2$ | 0.06 | 0.46 | 0.02 | 0.15 | 0.19 | 0.19 | 0.15 |
| $F_2$ | 1.41 | 0.09 | 0.51 | 2.53 | 2.59 | 2.59 | 0.22 |
| $Al_2O_3$ | — | 0.17 | 0.35 | 0.05 | 0.33 | 0.33 | 0.17 |
| Ion exchange temperature, °C. | 500 | 450 | 400 | 450 | 480 | 480 | 520 |
| Ion exchange time, h | 10 | 1.5 | 5 | 4 | 6 | 6 | 20 |
| Thickness of the compressive stress zone, µm | 105 | 35 | 45 | 52 | 128 | 125 | 220 |
| Amount of alkali metal leached, µg | 21 | 20 | 24 | 22 | 18 | 23 | 17 |
| "Stress relaxation" at 300° C., h | 950 | >1000 | >1000 | 700 | 800 | 850 | >1000 |
| Flexural strength, $N/mm^2$ | 720 | 490 | 410 | 560 | 640 | 620 | 900 |
| Knoop hardness, KH | 585 | 590 | 600 | 545 | 562 | 568 | 609 |
| Modulus of elasticity E, $kN/mm^2$ | 70 | 71 | 72 | 66 | 68 | 68 | 72 |
| Coefficient of thermal expansion $\alpha_{20/300}$, $10^{-6}/K$ | 8.2 | 8.9 | 9.1 | 9.6 | 9.1 | 9.1 | 8.9 |
| Glass transition temperature, $T_g$ | 595 | 632 | 618 | 565 | 573 | 579 | 626 |

The amount of alkali metal leached out is taken to mean the total amount of alkali metal ions, given in µg leached out per hard disk substrate in the above-described test under the stated conditions.

The "stress relaxation [h]" line shows the time in hours at constant temperature (300° C.) at which a measurable reduction in the thickness of the compressive stress zone occurs, where thickness changes of 4 µm and more can be measured. The optical method used has already been explained. Such a reduction in the thickness of the compressive stress zone is associated with a reduction in compressive stress and is easier to measure than the compressive stress reduction itself.

During chemical hardening of a glass having the composition of Example 3 from Table 1 in a $KNO_3$ bath, the exchange time was varied between ½ h and 15 h and the bath temperature between 350° C. and 550° C. The compressive stress zone thicknesses achieved are shown in µm in Table 2. Thicknesses of the compressive stress zones of between 14 and 230 µm were achieved, with, as expected, lower temperatures making longer residence times necessary.

TABLE 2

Compressive Stress Zones [µm] as a function of Exchange Time and Salt-Bath Temperature for a Glass having the Composition of Example 3 from Table 1

| | Bath temperature [°C.] | | | | |
|---|---|---|---|---|---|
| Exchange time [h] | 350 | 400 | 450 | 500 | 550 |
| 0.5 | | | 14 | 20 | 38 | 46 |
| 1 | | | 26 | 55 | 68 |
| 1.5 | | 20 | 30 | 60 | 90 |
| 2.5 | | 31 | — | — | — |
| 4 | | — | 42 | — | 121 |
| 5 | | 45 | — | 98 | — |
| 8 | | — | 75 | — | — |
| 10 | | | 63 | 90 | 132 | 182 |
| 15 | 47 | 72 | 103 | 166 | 230 |

The thickness of the compressive stress zone-is thus clearly dependent both on the exchange time (at constant exchange temperature) and on the exchange temperature (at constant exchange time).

Table 3 shows that this dependence does not apply significantly to the compressive stress at the surface, but certainly does for the flexural strength. Again, the example glass selected was the glass having the composition of Example 3 from Table 1.

TABLE 3

Thickness of the Compressive Stress Zone, Compressive Stress at the Surface and Flexural Strength as a function of the Exchange Time at Constant Salt-bath Temperature (450° C.) for a Glass having the Composition of Example 3 from Table 1:

| Exchange time, h | Thickness of the compressive stress zone, µm | Compressive stress at the surface, $N/mm^2$ | Flexural Strength, $N/mm^2$ |
|---|---|---|---|
| 1.5 | 30 | 880 ± 30 | 430 |
| 15 | 103 | 775 ± 30 | 800 |

These very good flexural strength values make the prestressed glass produced by the novel process highly suitable for withstanding the mechanical loads to which hard disks are subjected or will be subjected (increasing speeds of future hard disks).

The temperature dependence of the stress relaxation mentioned above in Table 1 is shown by Table 4. To this end, a hard disk substrate made from a glass having the composition of Example 7 from Table 1 was hardened for 20 hours in a $KNO_3$ bath at 520° C. A 220 $\mu$m compressive stress zone having a compressive stress of 800 N/mm² formed. Table 3 shows the time at various temperatures before a reduction in the thickness of the compressive stress zone is observed.

TABLE 4

Temperature and Time before a Mesurable Reduction (4 $\mu$m) in the thickness of the Compressive Stress Zone occurs, for a Glass having the Composition of Example 7 from Table 1:

| Temperature, °C. | Time, h |
|---|---|
| 300 | >1000 |
| 350 | 500 |
| 400 | 100 |
| 500 | 30 |

Extrapolation gives a time of more than 50,000 hours at a temperature of 200° C. before stress reduction occurs. For significantly lower temperatures, for example <60° C., the compressive stress can be regarded as being maintained virtually indefinitely along with the strength properties.

In addition to the high flexural strength, the low leaching of alkali metals, i.e. the high chemical resistance, is characteristic of glasses produced by the novel process. In order to illustrate this property, prestressing times and temperatures were again varied during chemical prestressing by immersion of the glass of Example 3 in a $KNO_3$ (Table 1), and the alkali metal leaching was determined in each case. The results are shown in Table 5 (variation of the exchange time) and in Table 6 (variation of the exchange temperature). In each case, three samples were leached and the amount leached out determined, the results mentioned being reproduced.

TABLE 5

Amount of Alkali Metals leached out in $\mu$g per Hard Disk Substrate as a function of the Prestressing Time at Constant Salt-bath Temperature (450° C.) for a Glass having the Composition of Example 3 from Table 1:

| Prestressing time, h | Leaching [$\mu$g/sample] | | |
|---|---|---|---|
| | Na+ | K+ | Σ Na+ + K+ |
| 0 | 22 | 3 | 25 |
| 0.5 | 2 | 20 | 22 |
| 1.5 | 2 | 22 | 24 |
| 2.0 | 2 | 22 | 24 |
| 4.0 | 2 | 24 | 26 |
| 10.0 | 3 | 16 | 19 |
| 15.0 | 6 | 8 | 14 |

In the first line, the unstressed glass with a prestressing time of 0 hours is shown as comparison. The variations in the distribution of the leached-out ions arises from the different elemental distribution at the surface of stressed and unstressed glasses. However, it is striking and significant that the total amount of alkali metal ions leached out in the case of the prestressed glasses is just as low as in the case of the glass which has not been chemically prestressed. The good chemical resistance is thus retained even after prestressing. Surprisingly, alkali metal leaching hardly increases at all with increasing prestressing time, and indeed even becomes less at long exchange times!

TABLE 6

Alkali Metal Leaching in $\mu$g per Hard Disk Substrate as a function of the Prestressing Temperature at Constant Prestressing Time (2 h) for a Glass having the Composition of Example 3 from Table 1:

| Prestressing temperature, °C. | Leaching [$\mu$g/sample] | | |
|---|---|---|---|
| | Na+ | K+ | Σ Na+ + K+ |
| 350 | 6 | 22 | 28 |
| 400 | 2 | 21 | 23 |
| 450 | 2 | 22 | 24 |
| 500 | 3 | 20 | 23 |
| 550 | 3 | 21 | 24 |

The alkali metal leaching is hardly affected by the prestressing temperature.

The fact that glasses having the composition described which have been chemically prestressed under the stated conditions can be considerably reduced in thickness, for example polished, without their alkali metal leaching, i.e. their chemical resistance, being significantly changed is shown by Table 7, in which the alkali metal leaching of a hard disk substrate having the composition of Example 3 from Table 1 which has been polished with cerium oxide on both sides to a thickness reduction of 10 $\mu$m in each case not before, but after prestressing, is shown for two different prestressing times. The residual roughness was <1 nm. The thickness of the compressive stress zone was 33 $\mu$m (prestressing time 2.5 h) or 40 $\mu$m (prestressing time 3.0 h) before the polishing. The values given were again verified by a triple determination.

TABLE 7

Alkali Metal Leaching in $\mu$g per Hard Disk Substrate for Prestressing Times at a Prestressing Temperature of 460° C. on a Hard Disk Substrate having the Composition of Example 3 from Table 1 which has been polished on both sides with a drop in thickness of 10 $\mu$m in each case after Prestressing.

| Prestressing time, h | Leaching [$\mu$g/sample] | | |
|---|---|---|---|
| | Na+ | K+ | Σ Na+ + K+ |
| 2.5 | 5 | 10 | 15 |
| 3.0 | 5 | 13 | 18 |

This clearly shows the advantage of the procedure in the specific embodiment of the invention described, namely polishing only after prestressing: the good chemical resistance is retained, and the surface quality, which was impaired in some cases by ion exchange, is permanently improved by this late polishing.

By "in mol % based on oxides" in the appended claims we mean that the moles of the ingredient is divided by the total number of moles of oxides in a sample to obtain the mol %.

The disclosure in German Patent Application DE 196 16 679.9-45 of Apr. 26, 1996 is incorporated here by reference. This German Patent Application, at least in part, describes the invention described hereinabove and claimed in the claims appended herein in below and provides the basis for a claim of priority for the instant invention under 35 U.S.C. 119.

While the invention has been illustrated and described as embodied in a process for producing a chemically prestressed glass and a method of use of the prestressed glass to make a hard disk, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A process for producing a chemically prestressed glass of high breaking strength and high chemical resistance, said process comprising chemically prestressing a starting glass having the composition (in mol %, based on oxides):

$SiO_2$ from 63.0 to 67.5 mol %,
$Al_2O_3$ from 9.5 to 12.0 mol %,
$Na_2O$ from 8.5 to 15.5 mol %,
$K_2O$ from 2.5 to 4.0 mol %,
MgO from 3.0 to 9.0 mol %,
Σ CaO+SrO+BaO+ZnO from 0 to 2.5 mol %,
$TiO_2$ from 0.5 to 1.5 mol %,
$CeO_2$ from 0.02 to 0.5 mol %,
$As_2O_3$ from 0 to 0.35 mol %,
$SnO_2$ from 0 to 1.0 mol %, and
$F_2$ from 0.05 to 2.6 mol %, wherein a molar ratio of said $SiO_2$ to said $Al_2O_3$ in said starting glass is between 5.3 and 6.85, a molar ratio of said $Na_2O$ to said $K_2O$ in said starting glass is between 3.0 and 5.6, a molar ratio of said $Al_2O_3$ to said $K_2O$ in said starting glass is between 2.8 and 3.6 and a molar ratio of said $Al_2O_3$ to at total amount of said $TiO_2$ and said $CeO_2$ is from 7.6 to 18.5; in an ion exchange bath comprising more than 90% by weight of at least one potassium salt at a temperature between 350° C. and 550° C. and at a residence time of between 0.5 and 20 hours to form the chemically prestressed glass.

2. The process as defined in claim 1, wherein said starting glass contains at least 0.02 mol % of at least one ingredient selected from the group consisting of $As_2O_3$ and $SnO_2$.

3. The process as defined in claim 1, wherein said starting glass contains from 0.02 to 0.35 mol % of $As_2O_3$.

4. The process as defined in claim 1, further comprising polishing said glass after said chemical prestressing.

5. The process as defined in claim 1, wherein said at least one potassium salt is selected from the group consisting of potassium salts containing anions stable at said temperature between 350° and 550° C.

6. The process as defined in claim 1, wherein said at least one potassium salt consists of potassium nitrate.

7. The process as defined in claim 1, wherein said subjecting of the starting glass to said chemical ion exchange comprises immersing said starting glass in said salt bath and leaving said starting glass in said salt bath for said residence time.

8. A process as defined in claim 1, wherein a chemically prestressed glass is in the form of a hard disk.

* * * * *